United States Patent
Righi et al.

(10) Patent No.: US 7,861,119 B1
(45) Date of Patent: Dec. 28, 2010

(54) UPDATING A FIRMWARE IMAGE USING A FIRMWARE DEBUGGER APPLICATION

(75) Inventors: Stefano Righi, Lawrenceville, GA (US); Ashraf Javeed, Karnataka (IN)

(73) Assignee: American Megatrends, Inc., Norcross, GA (US)

( * ) Notice: Subject to any disclaimer, the term of this patent is extended or adjusted under 35 U.S.C. 154(b) by 406 days.

(21) Appl. No.: 11/952,595

(22) Filed: Dec. 7, 2007

(51) Int. Cl.
*G06F 11/00* (2006.01)

(52) U.S. Cl. .............................. 714/38; 714/5; 714/25; 714/26; 714/703; 717/125; 717/172

(58) Field of Classification Search .................. 714/25, 714/26, 38, 703, 5; 717/125, 172
See application file for complete search history.

(56) References Cited

U.S. PATENT DOCUMENTS

| | | | | |
|---|---|---|---|---|
| 5,615,331 A * | 3/1997 | Toorians et al. | ................. | 714/9 |
| 5,901,225 A * | 5/1999 | Ireton et al. | ..................... | 714/7 |
| 5,903,718 A * | 5/1999 | Marik | ......................... | 714/38 |
| 5,958,049 A * | 9/1999 | Mealey et al. | .................. | 713/1 |
| 6,401,218 B1 * | 6/2002 | Linam et al. | .................. | 714/25 |
| 6,584,590 B1 * | 6/2003 | Bean | ......................... | 714/724 |
| 6,721,941 B1 * | 4/2004 | Morshed et al. | ............. | 717/127 |
| 6,983,362 B1 * | 1/2006 | Kidder et al. | .................. | 713/1 |
| 7,055,148 B2 * | 5/2006 | Marsh et al. | ................. | 717/172 |
| 7,225,245 B2 * | 5/2007 | Gurumoorthy et al. | ...... | 709/223 |
| 7,266,595 B1 * | 9/2007 | Black et al. | .................. | 709/223 |
| 7,308,492 B2 * | 12/2007 | Konopka et al. | ............ | 709/221 |
| 7,313,791 B1 * | 12/2007 | Chen et al. | ................... | 717/170 |
| 7,543,277 B1 * | 6/2009 | Righi et al. | .................. | 717/125 |
| 7,562,208 B1 * | 7/2009 | Reed et al. | ...................... | 713/1 |
| 7,577,981 B2 * | 8/2009 | Clynes et al. | ................ | 725/132 |
| 2002/0169997 A1 * | 11/2002 | Chen | ........................... | 714/25 |
| 2003/0065935 A1 * | 4/2003 | Neufeld | ...................... | 713/200 |
| 2004/0031030 A1 * | 2/2004 | Kidder et al. | ................. | 717/172 |
| 2004/0114808 A1 * | 6/2004 | Rothman et al. | ............. | 382/232 |
| 2004/0230963 A1 * | 11/2004 | Rothman et al. | ............ | 717/168 |
| 2005/0044345 A1 * | 2/2005 | Suzuki et al. | ................ | 712/227 |
| 2005/0044452 A1 * | 2/2005 | Suzuki et al. | .................. | 714/38 |
| 2005/0125649 A1 * | 6/2005 | Lu et al. | ......................... | 713/1 |
| 2006/0020779 A1 * | 1/2006 | Rothman et al. | ................ | 713/2 |
| 2006/0048006 A1 * | 3/2006 | Lou | ............................. | 714/25 |
| 2006/0184717 A1 * | 8/2006 | Rothman et al. | ............. | 711/103 |
| 2007/0169076 A1 * | 7/2007 | Desselle et al. | .............. | 717/168 |
| 2007/0204259 A1 * | 8/2007 | Wilner et al. | ................ | 717/124 |
| 2007/0226477 A1 * | 9/2007 | Haban et al. | .................... | 713/1 |
| 2007/0234126 A1 * | 10/2007 | Lu et al. | ........................ | 714/38 |

(Continued)

*Primary Examiner*—Philip Guyton
*Assistant Examiner*—Joshua P Lottich
(74) *Attorney, Agent, or Firm*—Hope Baldauff Hartman, LLC

(57) ABSTRACT

Systems, methods, and computer-readable media provide for updating a firmware image during a debugging sequence using a firmware debugger application without re-flashing each updated firmware image on a non-volatile memory device. Embodiments include a debugger application operating on a host computer system and a debugger driver located within a firmware image undergoing the debugging sequence on a target computer system. The debugger application and debugger driver may communicate and transfer data between one another. Upon detecting an error in a firmware image, the debugger driver notifies the debugger application. The debugger application sends an updated firmware image to the debugger driver on the target computer system. The debugger driver loads the updated firmware image and passes control to an entry point of the updated firmware image for continued debugging from the new entry point.

14 Claims, 6 Drawing Sheets

U.S. PATENT DOCUMENTS

| | | | |
|---|---|---|---|
| 2008/0052702 A1* | 2/2008 | Chuang | 717/170 |
| 2008/0065577 A1* | 3/2008 | Chefalas et al. | 706/47 |
| 2008/0072103 A1* | 3/2008 | Lou | 714/38 |
| 2009/0083475 A1* | 3/2009 | Hsiao et al. | 711/103 |
| 2009/0113196 A1* | 4/2009 | Jan et al. | 713/2 |

* cited by examiner

UPDATING A FIRMWARE IMAGE USING A FIRMWARE DEBUGGER APPLICATION

BACKGROUND

Firmware may be described as software that is embedded within a hardware device. Typically, firmware that includes a basic input/output system (BIOS) for a particular computer hardware configuration is stored or "flashed" onto a read-only memory (ROM) device or other non-volatile memory. Many computer systems utilize a BIOS when powering on in order to prepare the computer system to recognize and control various devices within the computer system. Because firmware is made up of any number of drivers, or modules, that support the specific hardware contained within the target computer system in which the firmware will be installed, it must be created by a BIOS engineer according to the specific configuration of the target computer system.

When creating firmware for a target computer system, a BIOS engineer will create a firmware image, containing all of the desired firmware modules corresponding to the target computer system. This firmware image is then flashed onto a ROM device and installed within the target computer system for testing. When errors are found during testing, a new firmware image containing any updated firmware modules must be created and re-flashed onto the ROM device. The ROM device is again placed in the target computer system and testing can resume. Each time the firmware needs to be updated, a new firmware image must be created and re-flashed onto the ROM device. This process is time consuming and expensive.

There are hardware-based devices available that simulate a ROM device. An example of such a device is an in-circuit emulator (ICE). An ICE is typically an adapter card that must be physically connected to the motherboard of the target computer system. While an ICE allows firmware to be debugged without re-flashing each time an update to the firmware image is required, an ICE is an expensive solution that requires a reconfiguration of the target computer system through the addition of an adapter card during firmware debugging.

It is with respect to these considerations and others that the disclosure made herein is provided.

SUMMARY

Systems, methods, and computer-readable media are provided herein for updating a firmware image using a firmware debugger application. According to one implementation described herein, a method includes establishing a communications link with a target computer system using a debugger driver within an initial firmware image that is executing during a debugging sequence on the target computer system. The initial firmware image includes the debugger driver and multiple firmware modules. An error notification associated with one or more problem firmware modules is received from the debugger driver via the communications link.

An updated firmware image that includes one or more firmware modules to replace the problem firmware modules is received from a basic input/output system (BIOS) development application. The updated firmware image is transmitted to the target computer system via the communications link. The debugger application is instructed to load the updated firmware image into memory of the target computer system and to pass control of the initial firmware image to the designated entry point of the updated firmware image such that the debugging sequence continues from the designated entry point of the updated firmware image.

According to another implementation of the disclosure presented herein, a debugging sequence in a target computer system is initialized utilizing an initial firmware image. The initial firmware image includes a debugger driver and multiple firmware modules. A communication link is established with a host computer system via a debugger application residing on the host computer system. An error is detected during the debugging sequence and the host computer system is notified of the error via the communications link. An updated firmware image is received from the host computer system via the debugger application. The updated firmware image includes one or more firmware modules for replacing the problem firmware modules. Instructions from the debugger application are executed. These instructions include loading the updated firmware image into memory of the target computer system and to pass control of the initial firmware image to a designated entry point of the updated firmware image such that the debugging sequence continues from the designated entry point of the updated firmware image.

Yet another implementation includes a debugger application and a debugger driver. The debugger application can communicate with a debugger driver to receive an error notification from the debugger driver that indicates one or more problem firmware modules within the initial firmware image. Additionally, the debugger application may receive an updated firmware image from a BIOS development application that includes one or more firmware modules for replacing the one or more problem firmware modules within the initial firmware image and a designated entry point. The debugger application can transmit the updated firmware image to the target computer system via the communications link. The debugger application may instruct the debugger driver to load the updated firmware image into memory of the target computer system and to pass control of the initial firmware image to the designated entry point of the updated firmware image so that the debugging sequence continues from the designated entry point of the updated firmware image.

The debugger driver can use the initial firmware image to initiate a debugging sequence in the target computer system. The initial firmware image includes a debugger driver and multiple firmware modules. The debugger may establish a communications link with the debugger application of the host computer system. During the debugging sequence, the debugger driver can detect an error associated with one or more problem firmware modules and notify the host computer system. The debugger driver can receive an updated firmware image from the host computer system via the debugger application and execute instructions received from the debugger application to load the updated firmware image into the memory of the target computer system and to pass control of the initial firmware image to the designated entry point of the updated firmware image such that the debugging sequence continues from the designated entry point of the updated firmware image.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
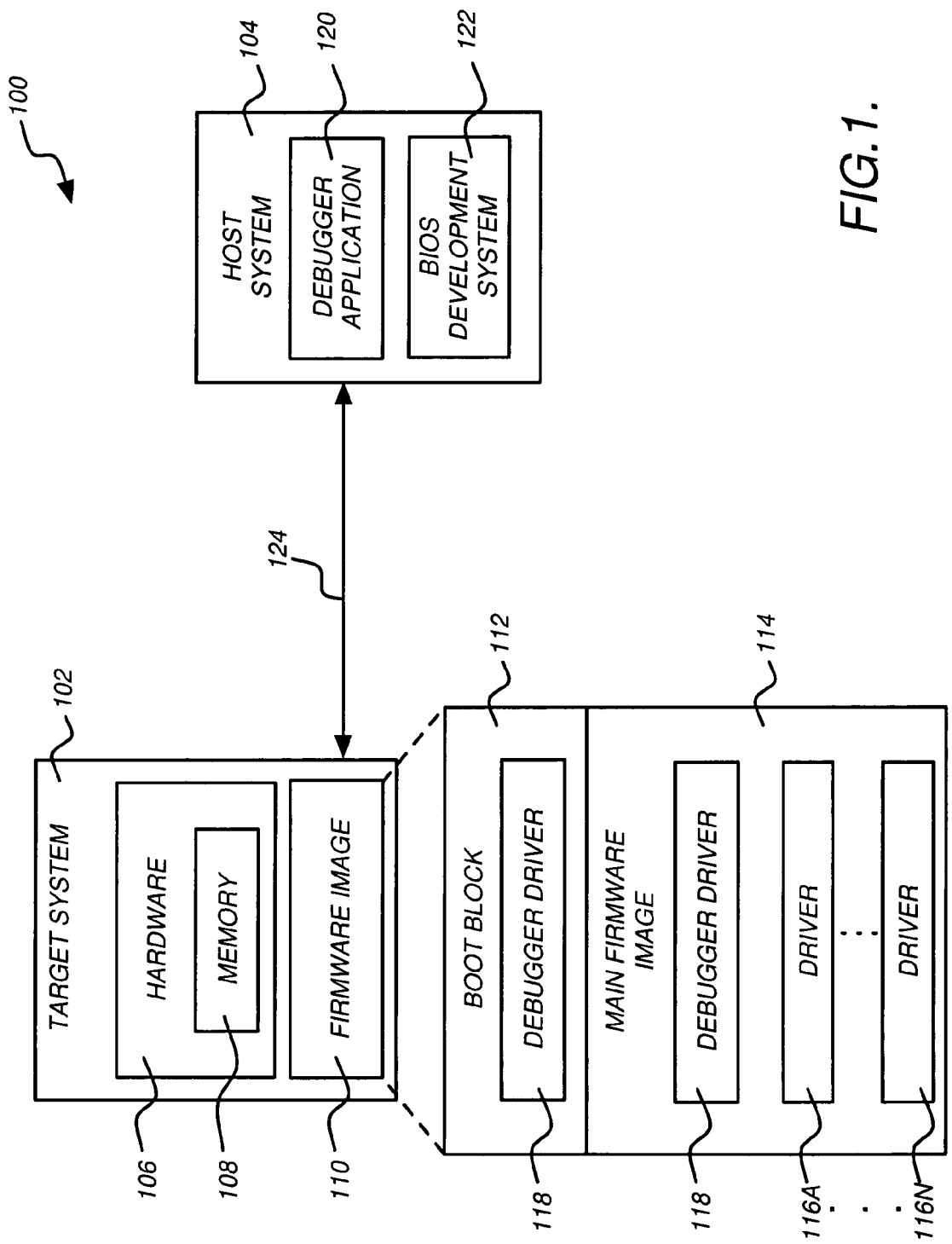
FIGS. 1-3 are block diagrams showing an illustrative operating environment for the processes and computer systems described herein, including several of the software components utilized by the computer systems described herein, and a process flow for updating a firmware image according to one embodiment presented herein.

The following detailed description is directed to systems, methods, and computer-readable media for updating a firmware image using a firmware debugger application. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that the embodiments presented herein may be utilized with any type of local area network (LAN) or wide area network (WAN).

As stated briefly above, updating a firmware image during debugging is typically a time consuming process since the firmware image often must be flashed into non-volatile memory multiple, and often numerous, times before the debugging process is complete. Implementations of the disclosure provided herein provide for updating a firmware image using a firmware debugger application without the need to physically flash updated firmware images into a ROM device or other non-volatile memory. According to various embodiments, a debugger application residing on a host computer system communicates with a debugger driver located within a firmware image undergoing a debugging process on a target computer system.

Through this communications link, a BIOS engineer can transmit updated firmware images, or individual firmware modules, to the target computer system. The debugger driver can receive an updated firmware image from the host computer system and pass control to the entry point of the updated firmware image to allow the debugging process to continue using the updated firmware image. This process may be repeated to update the firmware image within the RAM of the target computer system without the necessity of flashing an updated firmware image on a ROM device each time a firmware image update is required. This process eliminates the additional expense associated with hardware solutions to the firmware debugging issue. Moreover, by updating the firmware image in RAM instead of ROM, not only is the updating process faster, it is also possible to utilize firmware images that are larger in size than the ROM device is capable of storing. Often, a debug version of the firmware image may be larger than the release version will ultimately be. By allowing updates to a firmware image to occur in RAM, then size conflicts with the ROM device may be avoided.

Figure 2:
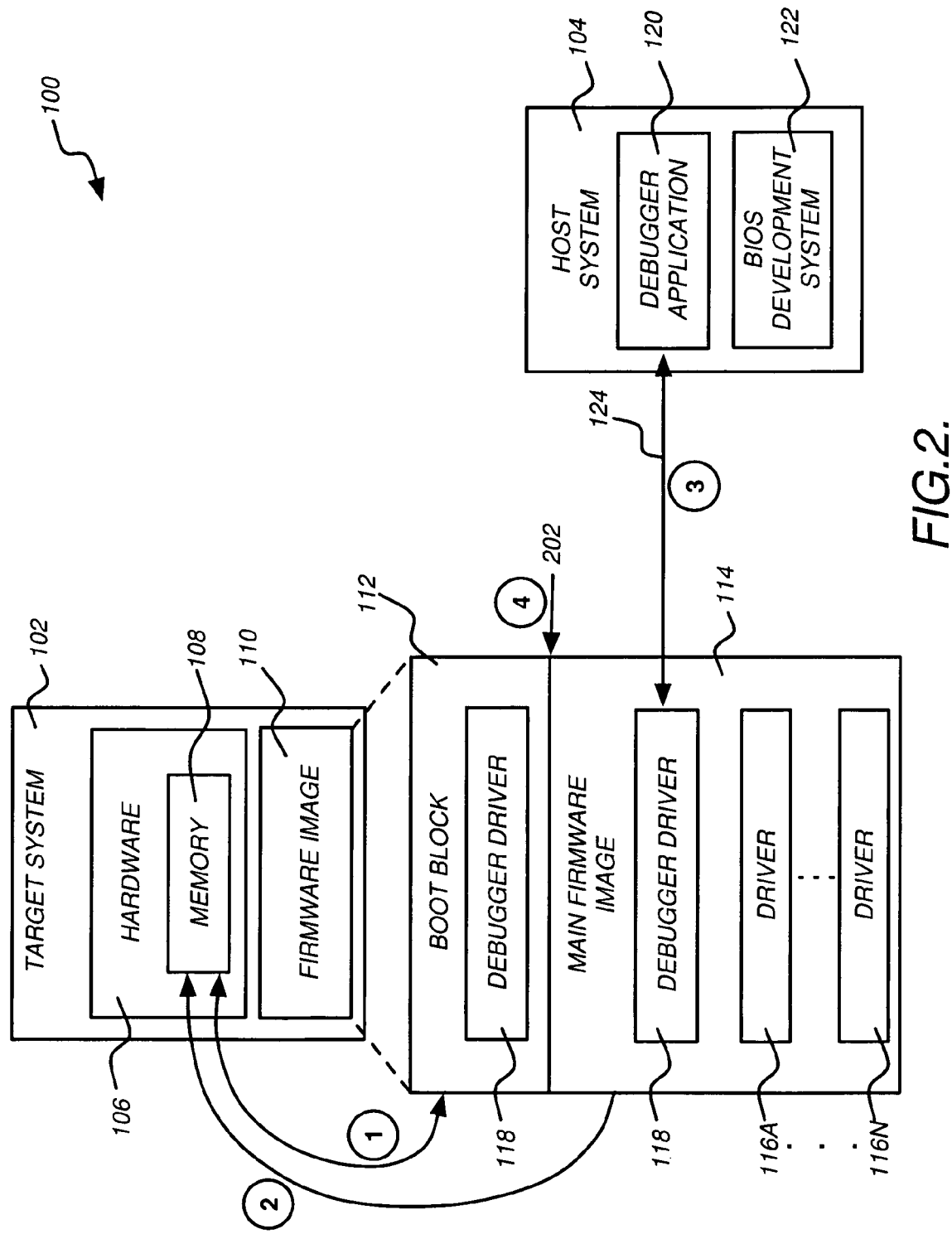
Figure 3:
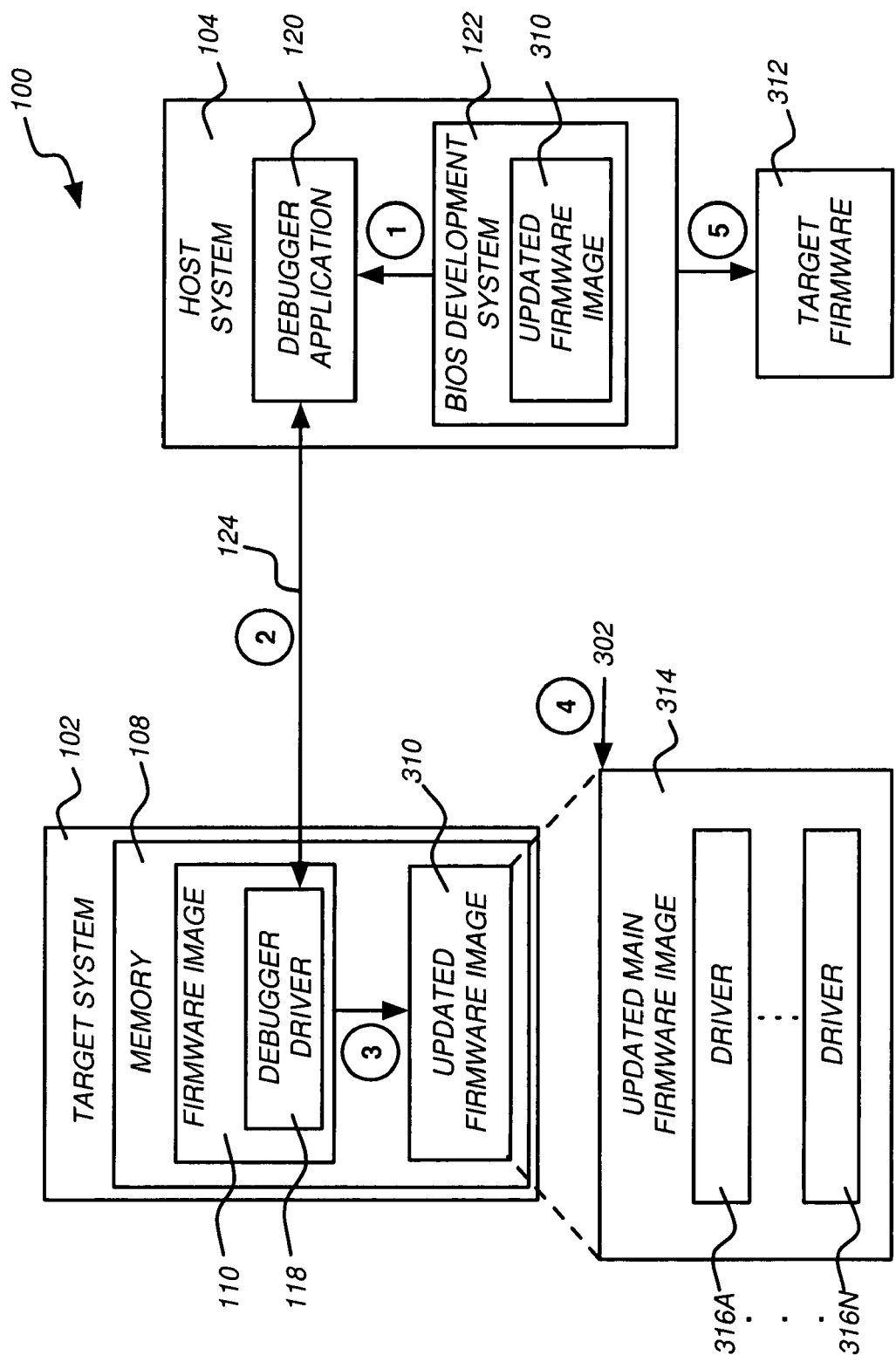

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for updating a firmware image using a firmware debugger application will be described. FIG. 1 shows a firmware debugging system 100 that is prepared to begin debugging a firmware image 110. FIGS. 2 and 3 will illustrate various components of the firmware debugging system 100 and actions taken by those components during a debugging procedure according to implementations of the disclosure presented herein.

Looking at FIG. 1, the firmware debugging system 100 includes a target computer system 102 and a host computer system 104. The target computer system 102 includes hardware 106. It should be appreciated that the hardware 106 may include any number and type of computer hardware devices, including memory 108. As will be described below with respect to FIG. 5, the memory 108 may include either random access memory (RAM) or ROM or both. For the purposes of the example debugging and firmware updating process described below with respect to FIGS. 2 and 3, the memory 108 may be RAM. However, it should be appreciated that the disclosure presented herein allows for a firmware image to be updated in random access memory (RAM) or flash memory.

The target computer system 102 further includes the firmware image 110. The firmware image 110 is the initial firmware image that is configured for the target computer system 102 and is being tested and debugged on the target computer system 102. It should be appreciated that the firmware image 110 may be initially flashed onto a ROM device and installed within the target computer system 102. Using the disclosure presented herein, a firmware image may be updated and tested numerous times without requiring a re-flash of the updated firmware image onto a ROM device each time an updated firmware image is created. It should also be appreciated that the firmware image 110 may alternatively be stored and executed from any other installed or removable non-volatile memory device within the target computer system 102 or may have been transmitted to the target computer system 102 by the host computer system 104 and stored on the target computer system 102 for execution and debugging.

The firmware image 110 includes a boot block portion 112 and a main firmware image portion 114. When the target computer system 102 is powered on, code within the boot block portion 112 of the firmware image 110 executes from the ROM device containing the firmware image 110. The code within the boot block portion 112 of the firmware image 110 enables the central processing unit (CPU) of the target computer system 102 and initializes the memory 108 prior to copying the main firmware image portion 114 to the memory 108. The main firmware image portion 114 is executed from the memory 108 rather than from the ROM device. The main firmware image portion 114 includes drivers 116A-116N. These drivers 116A-116N, or firmware modules, are used by the operating system of the target computer system 102 to control the hardware 106. It should be appreciated that the main firmware image portion 114 may include any quantity and type of drivers 116A-116N depending upon the hardware configuration of the target computer system 102.

According to one implementation of the disclosure presented herein, the firmware image 110 includes a debugger driver 118. The debugger driver 118 is used to locate errors within the firmware image 110 during testing. The debugger driver 118 contains code that allows for communication, control, and data transfer between the debugger driver 118 and a debugger application 120 located on the host computer system 104. The debugger driver 118 is loaded into the memory 108 of the target computer system 102 at an early stage in the debugging process to enable a BIOS engineer to control the firmware image testing and debugging process within the target computer system 102 from the host computer system 104. It should be understood that the debugger driver 118 may be located in the boot block portion 112 or the main firmware image portion 114 of the firmware image 110, or both.

The host computer system 104 includes the debugger application 120 and a BIOS development system 122. The BIOS development system 122 may include any software or hardware used by a BIOS engineer to create a firmware image 110 and subsequent firmware. It should be understood that the BIOS development system 122 may include the debugger application 120 or may be separate from and in communication with the debugger application 120. In prior firmware debugging systems, a BIOS engineer would use the BIOS development system 122 to create the firmware image 110, flash the firmware image 110 onto a ROM device, install the ROM device within the target computer system 102, and repeat the process each time an error during the debugging process required an updated firmware image. However, utilizing the implementations described below, updated firmware images may be electronically transmitted to the target computer system 102, installed, and executed using a communications link between the debugger application 120 within the host computer system 104 and the debugger driver 118 within the target computer system 102. The communications link may be physically enabled using a cable 124. It should be understood that the cable 124 may be a serial cable or a universal serial bus (USB) debugging cable.

Turning now to FIG. 2, a block diagram of the firmware debugging system 100 shows actions taken by various components of the firmware debugging system 100 upon initiating a debugging sequence. The actions to be discussed are shown with arrows and corresponding circled numbers. It should be understood that implementations of the disclosure presented herein are not limited to the actions shown or the order in which the actions are discussed or numbered. According to one embodiment, the debugging sequence begins with the execution of the code within the boot block portion 112. Action 1 shows the initialization of the memory 108 by the boot block portion 112 of the firmware image 110 undergoing the testing and debugging sequence. Once initialized, action 2 shows the copying of the main firmware image portion 114 of the firmware image 110 being copied to the memory 108.

Communication is established between the debugger driver 118 and the debugger application 120 of the target computer system 102 and the host computer system 104, respectively, at action 3. As discussed above, this communication is enabled using the serial or USB debugging cable 124. Once the main firmware image portion 114 has been copied to the memory 108, then control is passed to the entry point 202 of the main firmware image portion 114 in the memory 108 at action 4. This action may include passing a call to the entry point 202 such that the debugging sequence continues from the entry point 202 of the main firmware image portion 114 that has been copied into the memory 108, rather than from the main firmware image portion 114 of the firmware image 110 that is located on the ROM device. It should be appreciated that executing the main firmware image portion 114 from the memory 108 rather than from the ROM device significantly increases the speed of the firmware execution process and allows for sufficient memory capacity to enable data to be transferred from the host computer system 104 to the target computer system 102 using the communication link between the debugger driver 118 and the debugger application 120.

FIG. 3 is a block diagram of the firmware debugging system 100 showing actions taken by various components of the firmware debugging system 100 after errors in the firmware image 110 have been located. After discovering an error within the firmware image 110, a BIOS engineer will utilize the BIOS development system 122 to create an updated firmware image 310. It should be understood that the updated firmware image 310 may include an entire updated main firmware image portion 314, if the error requiring correction was located in the main firmware image portion 114 of the firmware image 110, or may include only those drivers 316A-316N in which one or more errors were detected. For example, if an error requiring correction was located in the driver 116A, then the updated firmware image 310 may include the entire updated main firmware image portion 314, which includes drivers 316A-316N, or the updated firmware image 310 may include only the driver 316A.

The updated firmware image 310 is received by the debugger application 120 at action 1. The debugger application 120 transmits the updated firmware image 310 to the debugger driver 118 within the memory 108 of the target computer system 102 via the cable 124 at action 2. With the updated firmware image 310, the debugger application 120 sends instructions to the debugger driver 118 to pass control to the entry point 302 associated with the updated firmware image 310. These instructions are complied with at actions 3 and 4, respectively. After passing control to the new entry point 302, the debugging sequence continues from that entry point, utilizing the drivers 316A-316N within the updated firmware image 310 rather than the drivers 116A-116N of the original firmware image 110. This process repeats for each error that requires correction.

In this manner, the BIOS engineer is able to save considerable time during debugging the firmware image 110 since the updated firmware images 310 are transmitted to the target computer system 102 electronically rather than requiring manual flashing of each updated firmware image 310 onto a ROM device and installing the ROM device into the target computer system 102. After the debugging sequence is complete, the BIOS development system 122 is used to create a final firmware image from all of the applicable error-free firmware modules, which is then flashed onto a ROM device to create the target firmware 312 for the target computer system 102. This debugging and firmware updating sequence will be described in greater detail below with respect to FIGS. 4A and 4B.

Figure 4A:
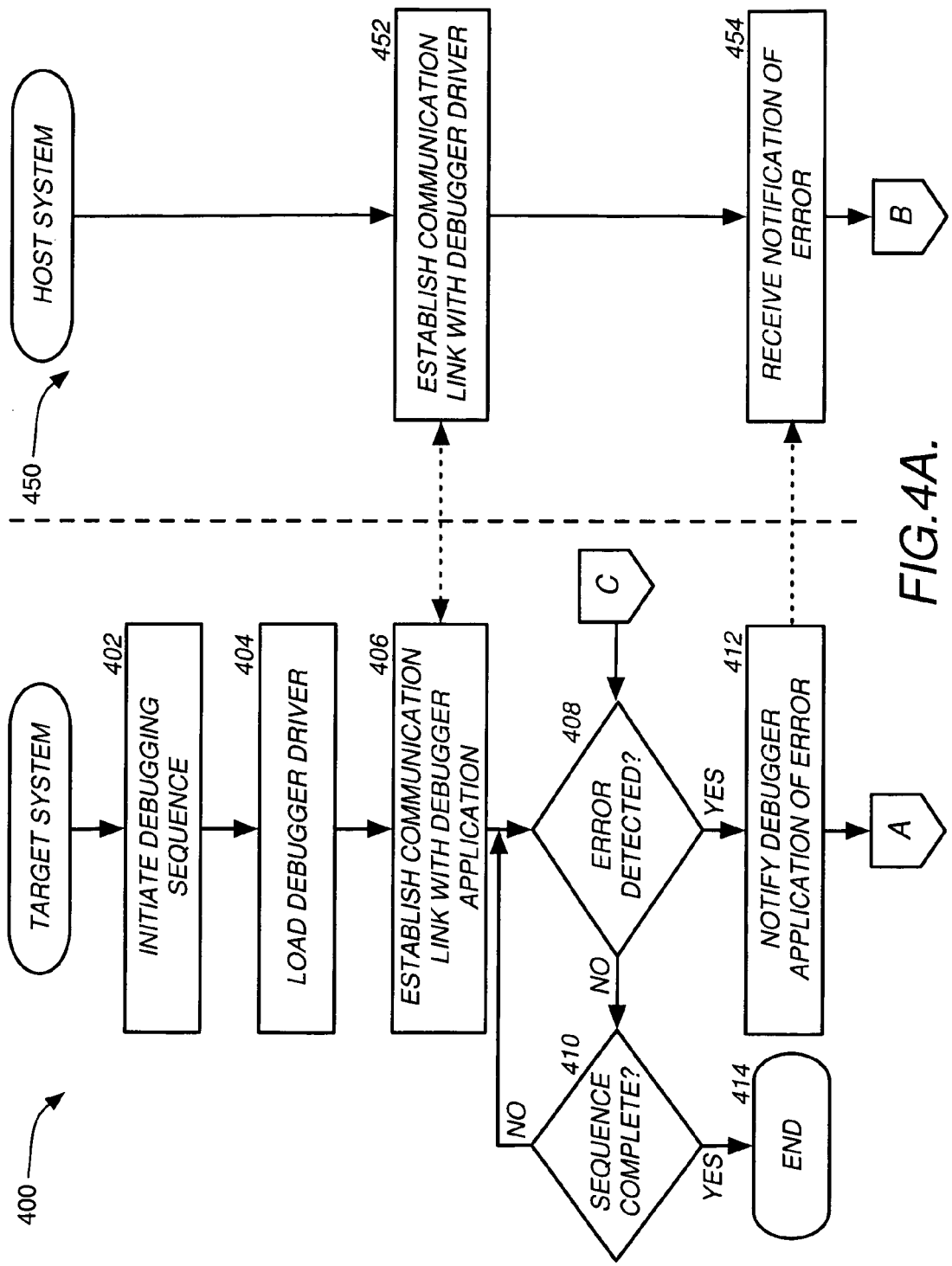
FIGS. 4A and 4B are flow diagrams showing aspects of the operation of a target computer system and a host computer system provided in one implementation described herein.
Figure 4B:
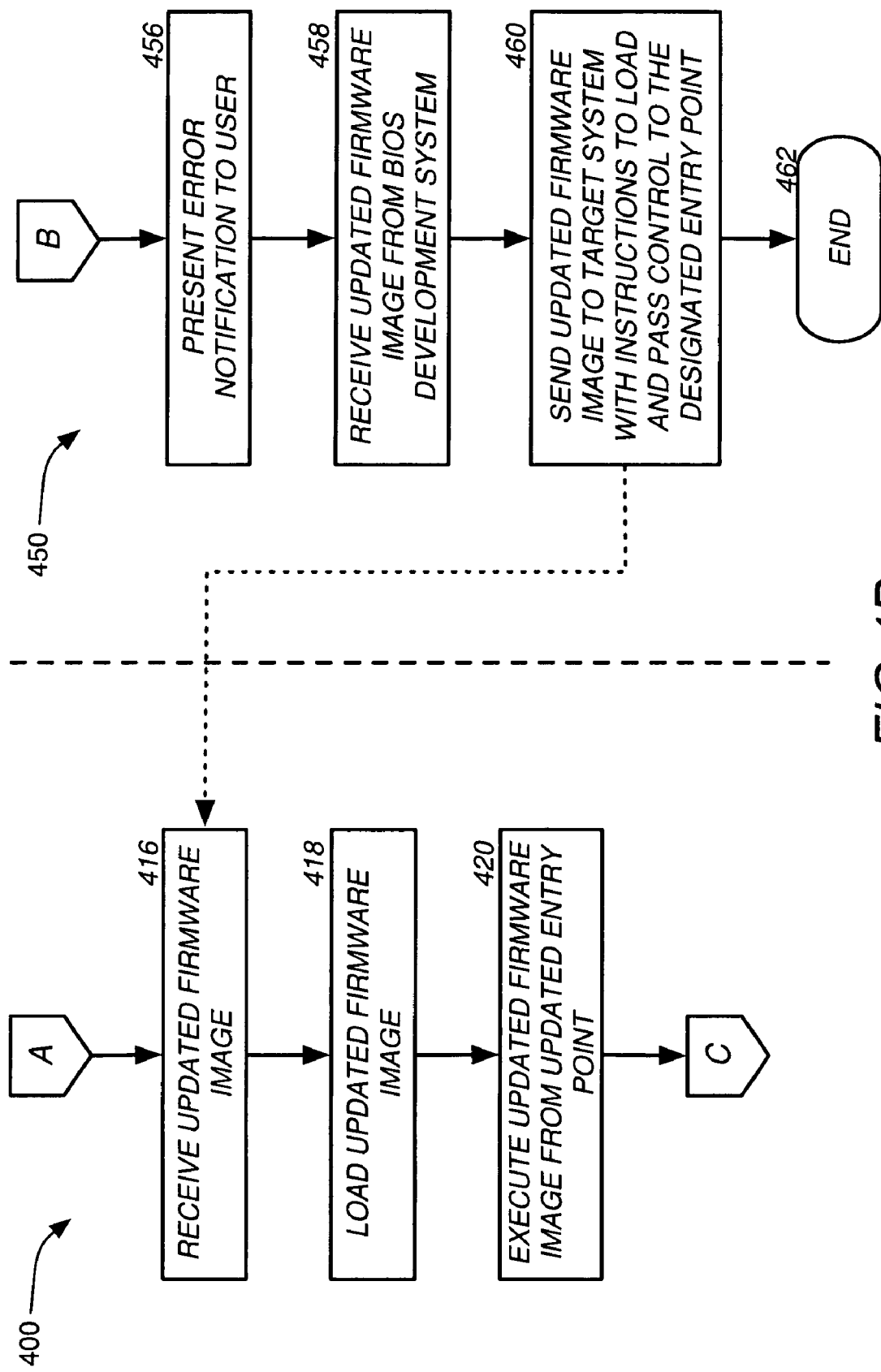

Turning now to FIGS. 4A and 4B, additional details will be provided regarding the operation of the target computer system 102 and the host computer system 104. In particular, FIGS. 4A and 4B are flow diagrams showing a routine 400 that illustrates aspects of the operation of the target computer system 102 and a routine 450 that illustrates aspects of the operation of the host computer system 104 for updating a firmware image using a firmware debugger application according to various embodiments presented herein. It should be appreciated that the logical operations described herein with respect to FIGS. 4A and 4B are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in FIGS. 4A and 4B and described herein. These operations may also be performed in a different order than those described herein with respect to FIGS. 4A and 4B.

The routine 400 begins at operation 402, where the target computer system 102 initiates the debugging sequence. As described above, the debugging sequence begins with the boot block portion 112 of the firmware image 110 executing code to initialize the memory 108 and copy the main firmware image portion 114 of the firmware image 110 into the memory 108. From operation 402, the routine 400 continues to operation 404, where the debugger driver 118 is loaded into the memory 108. This may occur when the main firmware image portion 114 is copied into the memory 108. The routine 400 continues from operation 404 to operation 406, where the debugger driver 118 establishes communication with the debugger application 120 within the host computer system 104. Routine 450, illustrating aspects of the operation of the host computer system 104, begins at operation 452 by establishing the communication link with the debugger driver 118. From operation 452, the routine 450 continues to operation 454 and proceeds as described below.

Returning to the routine 400, from operation 406, the routine 400 continues to operation 408, where the debugger driver 118 determines whether an error has occurred during the execution of the firmware image 110. If an error has not been detected at operation 408, the routine 400 proceeds to operation 410 where a determination is made as to whether the debugging sequence has completed. The debugging sequence has completed when all of the drivers 116A-116N have been executed, allowing the operating system of the target computer system 102 to successfully take control of all of the hardware 106 associated with the target computer system 102. If the debugging sequence has completed, which corresponds to an error-free firmware image 110, then the routine 400 continues to operation 414 and ends. However, if at operation 410, if it is determined that the debugging sequence has not completed, then the routine 400 returns to operation 408 and proceeds as described above.

At operation 408, if the debugger driver 118 detects an error in the debugging sequence, then the routine 400 continues to operation 412, where the debugger driver 118 notifies the debugger application 120 of the error via the established communications link. The debugger application 120 of the host computer system 104 receives the notification at operation 454 of routine 450. From operation 454, the routine 450 continues to operation 456, where the debugger application 120 presents the BIOS engineer or other user with the applicable details of the error. The BIOS engineer then creates an updated firmware image 310 using the BIOS development system 122. The routine 450 continues to operation 458, where the debugger application 120 receives the updated firmware image 310 from the BIOS development system. From operation 458, the routine 450 continues to operation 460, where the debugger application 120 sends the updated firmware image 310 to the target computer system 102 with instructions to load the updated firmware image 310 into the memory 108 of the target computer system 102 and to pass control to the entry point 302 of the updated firmware image 310. After sending the updated firmware image 310 to the target computer system 102, the routine 450 continues to operation 462 and ends.

At operation 416 of the routine 400, the debugger driver 118 receives the updated firmware image 310. As discussed above, the updated firmware image 310 may include an updated main firmware image portion 314, or may include one or more drivers 316A-316N to replace one or more drivers 116A-116N of the firmware image 110 that contain errors. From operation 416, the routine 400 continues to operation 418, where the debugger driver 118 loads the updated firmware image 310 into the memory 108. The routine continues from operation 418 to operation 420, where the debugger driver 118 passes control to the entry point 302 of the updated firmware image 310 so that the debugging sequence continues from the entry point 302 of the updated firmware image 310 rather than from any point in the firmware image 110, which contains one or more errors. From operation 420, the routine 400 returns to operation 408 and continues as described above. It should be understood that once the debugging sequence illustrated by routines 400 and 450 have completed, the BIOS engineer may create a target firmware 312 from the error-free modules of the firmware image 110 and any updated firmware image 310.

Figure 5:
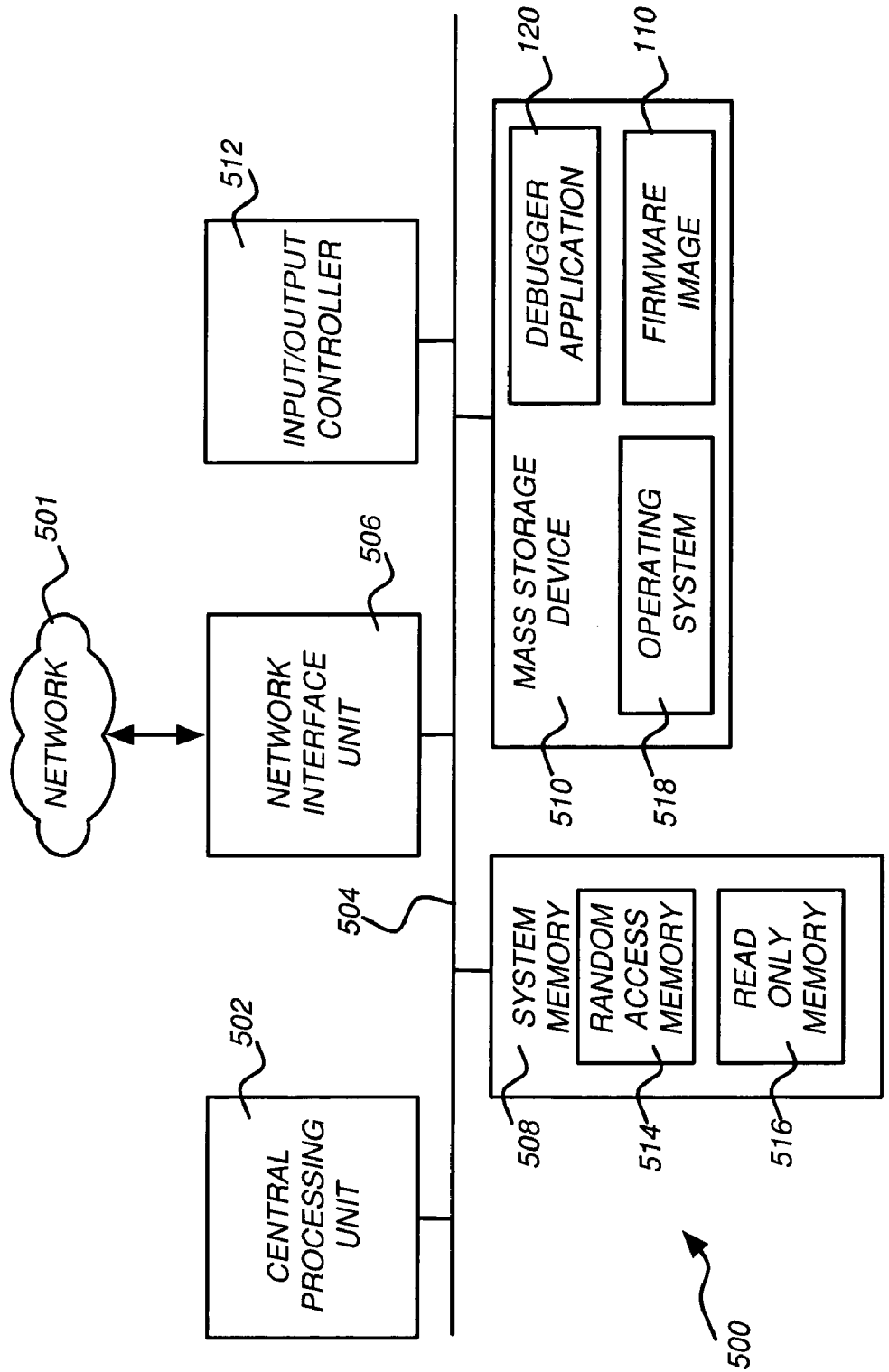
FIG. 5 is a computer architecture diagram showing a computer architecture suitable for implementing the various computer systems described herein.

Referring now to FIG. 5, an illustrative computer architecture for a computer 500 utilized in the various embodiments presented herein will be discussed. The computer architecture shown in FIG. 5 illustrates a conventional desktop, laptop computer, or server computer. The computer architecture shown in FIG. 5 includes a CPU 502, a system memory 508, including a RAM 514 and a ROM 516, and a system bus 504 that couples the memory to the CPU 502. A BIOS containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 501, such as the Internet. The computer 500 may connect to the network 501 through a network interface unit 506 connected to the bus 504. It should be appreciated that the network interface unit 506 may also be utilized to connect to other types of networks and remote computer systems. As described above, the host computer system 104 and the target computer system 102 communicate via a serial or USB debugging cable 124 according to various embodiments described herein. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored and executed using the mass storage device 510 and RAM 514 of the computer 500, including an operating system 518 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer or any other computing devices or systems or combinations thereof.

The mass storage device 510 and RAM 514 may also store and execute one or more program modules. In particular, the mass storage device 510 and the RAM 514 may store a debugger application 120, a firmware image 110 containing a debugger driver 118, and the other program modules described above with respect to FIG. 1. Other program modules may also be stored in the mass storage device 510 and utilized by the computer 500.

Based on the foregoing, it should be appreciated that systems, methods, and computer-readable media for updating a firmware image using a debugger application are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method of debugging a firmware image, comprising:
    establishing a communications link with a target computer system via a debugger driver within an initial firmware image executing during a debugging sequence on the target computer system, wherein the initial firmware image comprises the debugger driver and a plurality of firmware modules;
    receiving from the debugger driver via the communications link an error notification associated with one or more problem firmware modules within the initial firmware image executing during the debugging sequence;
    receiving an updated firmware image from a basic input/output system (BIOS) development system, the updated firmware image comprising one or more firmware modules for replacing the one or more problem firmware modules within the initial firmware image and a designated entry point;
    transmitting the updated firmware image to the target computer system via the communications link;
    instructing the debugger driver to load the updated firmware image into memory of the target computer system and to pass control of the initial firmware image to the designated entry point of the updated firmware image such that the debugging sequence continues from the designated entry point of the updated firmware image; and
    storing error-free modules from the initial firmware image and any updated firmware image in a non-volatile memory to create a firmware for the target computer system,
    wherein receiving the error notification, receiving the updated firmware image from the BIOS development system, transmitting the updated firmware image to the target computer system, and instructing the debugger driver to load the updated firmware image and pass control to the designated entry point occurs a plurality of times, each time corresponding to a plurality of problem firmware modules within the initial firmware image or an updated firmware image.

2. The method of claim 1, wherein the initial firmware image comprises a boot block portion and a main firmware image portion and wherein the debugger driver is located within the main firmware image portion.

3. The method of claim 1, wherein the initial firmware image comprises a boot block portion and a main firmware image portion and wherein the updated firmware image comprises a main firmware image portion only.

4. The method of claim 1, wherein the updated firmware image comprises a single firmware module only.

5. The method of claim 1, wherein the communications link is established via a universal serial bus (USB) debugger cable.

6. A computer-readable medium having computer-executable instructions stored thereon which, when executed by a computer, cause the computer to perform the method of claim 1.

7. A method of debugging a firmware image, comprising:
    initiating a debugging sequence in a target computer system utilizing an initial firmware image, wherein the initial firmware image comprises a debugger driver and a plurality of firmware modules;
    establishing a communications link with a host computer system via a debugger application on the host computer system;
    detecting an error during the debugging sequence associated with one or more problem firmware modules within the initial firmware image;
    notifying the host computer system of the error via the communications link;
    receiving an updated firmware image from the host computer system via the debugger application, the updated firmware image comprising one or more firmware modules for replacing the one or more problem firmware modules within the initial firmware image and a designated entry point;

executing instructions received from the debugger application to load the updated firmware image into memory of the target computer system and to pass control of the initial firmware image to the designated entry point of the updated firmware image such that the debugging sequence continues from the designated entry point of the updated firmware image; and storing error-free modules from the initial firmware image and any updated firmware image in a non-volatile memory to create a firmware for the target computer system, wherein detecting the error, notifying the host computer system of the error, receiving the updated firmware image from the host computer system, and executing the instructions from the host computer system occurs a plurality of times, each time corresponding to an error associated with a problem firmware module within the initial firmware image or within an updated firmware image.

8. The method of claim 7, wherein the initial firmware image comprises a boot block portion and a main firmware image portion and wherein the debugger driver is located within the boot block portion.

9. The method of claim 7, wherein the initial firmware image comprises a boot block portion and a main firmware image portion and wherein the updated firmware image comprises a main firmware image portion only.

10. A computer-readable medium having computer-executable instructions stored thereon which, when executed by a computer, cause the computer to perform the method of claim 7.

11. A system for debugging a firmware image, comprising:
a debugger application within a host computer system, the debugger application operative to communicate with a debugger driver within an initial firmware image on a target computer system,
  receive from the debugger driver an error notification associated with one or more problem firmware modules within the initial firmware image executing during a debugging sequence,
  receive an updated firmware image from a BIOS development system, the updated firmware image comprising one or more firmware modules for replacing the one or more problem firmware modules within the initial firmware image and a designated entry point,
  transmit the updated firmware image to the target computer system,
  instruct the debugger driver to load the updated firmware image into memory of the target computer system and to pass control of the initial firmware image to the designated entry point of the updated firmware image such that the debugging sequence continues from the designated entry point of the updated firmware image, and
  transmit a plurality of updated firmware images and associated instructions corresponding to a plurality of errors detected by the debugger driver during the debugging sequence; and the debugger driver within a target computer system, the debugger driver operative to
  initiate the debugging sequence in the target computer system utilizing the initial firmware image, wherein the initial firmware image comprises a debugger driver and a plurality of firmware modules,
  communicate with the host computer system via the debugger application on the host computer system,
  detect an error during the debugging sequence associated with one or more problem firmware modules within the initial firmware image,
  notify the host computer system of the error,
  receive the updated firmware image from the host computer system via the debugger application,
  execute the instructions received from the debugger application to load the updated firmware image into the memory of the target computer system and to pass control of the initial firmware image to the designated entry point of the updated firmware image such that the debugging sequence continues from the designated entry point of the updated firmware image, and
  receive the plurality of updated firmware images and associated instructions and to execute the instructions corresponding to each updated firmware image; and the BIOS development system operative to store a plurality of error-free modules from the initial firmware image and any updated firmware image in a non-volatile memory to create a firmware for the target computer system.

12. The system of claim 11, wherein the initial firmware image comprises a boot block portion and a main firmware image portion and wherein the debugger driver is located within the boot block portion and within the main firmware image portion.

13. The system of claim 11, wherein the initial firmware image comprises a boot block portion and a main firmware image portion and wherein the updated firmware image comprises a main firmware image portion only.

14. The system of claim 11, wherein the debugger driver is further operative to remove the one or more problem firmware modules of the initial firmware image prior to loading the updated firmware image into memory.

* * * * *